(12) United States Patent
Thiesen et al.

(10) Patent No.: US 7,116,213 B2
(45) Date of Patent: Oct. 3, 2006

(54) ACOUSTIC WAVE DEVICE WITH MODULATION FUNCTIONALITY

(75) Inventors: Jack Thiesen, Easley, SC (US); George Phillips O'Brien, Piedmont, SC (US)

(73) Assignee: Michelin Recherche et Technique S.A., (CH)

( * ) Notice: Subject to any disclaimer, the term of this patent is extended or adjusted under 35 U.S.C. 154(b) by 340 days.

(21) Appl. No.: 10/718,924

(22) Filed: Nov. 21, 2003

(65) Prior Publication Data

US 2004/0135675 A1  Jul. 15, 2004

Related U.S. Application Data

(60) Provisional application No. 60/428,302, filed on Nov. 22, 2002.

(51) Int. Cl.
*H04Q 1/00* (2006.01)

(52) U.S. Cl. ............. 340/10.1; 340/539.1; 340/539.26; 340/626; 340/442; 73/146

(58) Field of Classification Search ............... 73/146; 340/539.1, 539.26, 626, 442, 447, 10.1
See application file for complete search history.

(56) References Cited

U.S. PATENT DOCUMENTS

| | | | | |
|---|---|---|---|---|
| 5,585,571 A | * | 12/1996 | Lonsdale et al. | 73/862.325 |
| 2002/0117005 A1 | | 8/2002 | Vile et al. | |
| 2003/0234722 A1 | | 12/2003 | Lonsdale et al. | |
| 2004/0130442 A1 | * | 7/2004 | Breed et al. | 340/443 |
| 2004/0212486 A1 | * | 10/2004 | Dinello et al. | 340/445 |

FOREIGN PATENT DOCUMENTS

| | | |
|---|---|---|
| EP | 1052119 A1 | 11/2000 |
| WO | WO0247924 A1 | 6/2002 |
| WO | WO09821818 | 8/2002 |

OTHER PUBLICATIONS

English Language Abstract of EP 1 052 119 A1, Publication Date Nov. 15, 2000.

\* cited by examiner

*Primary Examiner*—Brian Zimmerman
(74) *Attorney, Agent, or Firm*—Dority &Manning

(57) ABSTRACT

An electronics assembly for integration with a tire structure or in another environment includes a condition-responsive device, an RF source, an antenna, and at least one controllable switching element. The condition-responsive device may comprise at least one acoustic wave resonator that is configured for monitoring such parameters as pressure and temperature within a tire or associated wheel assembly environment. The frequency and bandwidth of the RF source is preferably inclusive of the respective resonant frequency bands for each acoustic wave resonator. An antenna may also be connected to the condition-responsive device for facilitating the transmission of electric signals generated therein. In some embodiments, a switching element is coupled between the condition-responsive device and the RF source. Selective control of such switching element results in the modulation of data on the RF carrier, causing the condition-responsive device to transmit both sensed condition information as well as some other predefined digital data signal. Another controllable switching element may be provided in parallel with the condition-responsive device to selectively cloak the device for predetermined amounts of time, thus offering an anti-collision solution for multiple transmitting condition-responsive devices. The switching elements and corresponding control elements may respectively correspond to such devices as a field-effect transistor with a programmable microcontroller input or as an RFID transponder.

24 Claims, 5 Drawing Sheets

ACOUSTIC WAVE DEVICE WITH MODULATION FUNCTIONALITY

PRIORITY CLAIM

This application claims the benefit of previously filed U.S. Provisional Patent Application entitled "Acoustic Wave Device With Modulation Functionality," assigned U.S. Ser. No. 60/428,302, filed Nov. 22, 2002, and which is incorporated herein by reference for all purposes.

FIELD OF THE INVENTION

The present invention generally concerns electronics assemblies that transmit various information related to product identification and/or measurements of selected physical conditions in a given environment. More particularly, the subject electronics assemblies utilize acoustic wave devices that are provided with selectively controlled modulation functionality, thus yielding electronics assemblies capable of transmitting both sensed information as well as modulated data.

BACKGROUND OF THE INVENTION

The incorporation of electronic devices with pneumatic tire structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feed back systems to regulate proper tire parameters and vehicle performance.

Yet another potential capability offered by electronics systems integrated with tire structures corresponds to asset tracking and performance characterization for commercial vehicular applications. Commercial truck fleets, aviation craft and earth mover/mining vehicles are all viable industries that could utilize the benefits of tire electronic systems and related information transmission. Radio frequency identification (RFID) tags can be utilized to provide unique identification for a given tire, enabling tracking abilities for a tire. Tire sensors can determine the distance each tire in a vehicle has traveled and thus aid in maintenance planning for such commercial systems. Vehicle location and performance can be optimized for more expensive applications such as those concerning earth-mining equipment.

One particular type of condition-responsive device that has been utilized to determine various parameters related to a tire or wheel assembly is an acoustic wave device, such as a surface acoustic wave device (SAW). Such SAW devices include at least one resonator element made up of interdigital electrodes deposited on a piezoelectric substrate. When an electrical input signal is applied to a SAW device, selected electrodes cause the SAW to act as a transducer, thus converting the input signal to a mechanical wave in the substrate. Other electrodes then reverse the transducer process and generate an electrical output signal. A change in the output signal from a SAW device, such as a change in frequency, phase and/or amplitude of the output signal, corresponds to changing characteristics in the propagation path of the SAW device. In some SAW device embodiments, monitored resonant frequency and any changes thereto provide sufficient information to determine parameters such as temperature, pressure, and strain to which a SAW device is subjected.

Acoustic wave devices in the tire industry have typically been implemented as passive devices, as it has often been challenging in the past to implement complex electronic assemblies within a tire structure. Such passive acoustic wave devices are not provided with their own power supply. Instead, passive acoustic wave devices are interrogated by remote transceiver devices which transmit an energizing signal from a remote location to the acoustic wave device. The acoustic wave device stores some of this transmitted energy during excitation and may then transmit output signals indicating the resonant frequencies at which each resonator element in the acoustic wave device is excited.

Providing signals from a remote transceiver to an acoustic wave device often requires complex integrated circuitry as the interrogator must include electronics for both transmitting a signal to the acoustic wave device as well as for receiving a signal therefrom. Interrogation by a remote receiver often results in high levels of electromagnetic emissions as the transmitted signal must typically be characterized by power levels high enough to propagate through the communication channel formed by the tire or wheel assembly before reaching and energizing the acoustic wave device. Such high levels of electromagnetic emissions characterize a relatively inefficient means to interrogate the SAW transducer and may provide a potential source of interference in other nearby wireless communication systems. Thus, it may be desirable to provide an alternative system for relaying data between such tire electronics assemblies and a remote receiver location.

Another concern associated with passively operating acoustic wave devices is that many such devices typically exist in the same energizing field. This situation could occur when one sensor is provided in each of four or more tires on a given vehicle. When a remote transceiver emits an energizing signal to interrogate a given acoustic wave device, a plurality of signals may be received from multiple acoustic wave devices. A fundamental problem lies in the ability to distinguish among the received signals. For instance, since a shift in frequency output of an acoustic wave device is often being used to measure a physical phenomenon such as temperature or pressure, when several such acoustic wave devices are in the same energizing field at the same time conflicts such as overlaps in the respective resonant frequencies of the acoustic wave devices may exist, preventing resolution of unique frequency shifts for each respective acoustic wave device.

One known method for addressing the problem of utilizing multiple acoustic wave devices in the same energizing field corresponds to adding phase shift reflectors around planar antennas associated with the acoustic wave devices. This technique utilizes addressing functionality to overcome the problem of identification of various transmitting acoustic wave devices, but may limit other aspects of acoustic wave operation and is fundamentally limited by the number of available addresses. Thus, it may be desirable to provide an alternative solution for utilizing multiple acoustic wave devices in the same energizing field.

While various implementations of acoustic wave devices such as SAW sensors in tire electronic systems have been developed, no design has emerged that generally encompasses all of the desired characteristics as hereafter presented in accordance with the subject technology.

It should be appreciated that although examples of sensors have been described above with regard to potential application in a tire or wheel environment, the improved electronic assemblies and related aspects of the present invention as hereafter described can be utilized in any application in which it is desired to remotely sense physical parameters such as temperature or pressure. Examples of such application environments include, without limitation, tire or wheel assemblies or other locations associated with a vehicle, oil wells, refineries, water plants, etc.

SUMMARY OF THE INVENTION

In view of the recognized features encountered in the prior art and addressed by the present subject matter, an improved electronics assembly has been developed. Such an electronics assembly includes a condition-responsive device, such as an acoustic wave device, in combination with switching elements and control elements such that active device operation with signal modulation functionality and/or cloaking abilities are provided.

It is an advantage of some exemplary embodiments of the present invention to provide an actively operating electronic assembly that includes a condition-responsive device, which may correspond to an acoustic wave device. In accordance with such active operation, an acoustic wave sensor is provided with a proximal means for energizing the sensor such that it can actively transmit to a remote receiver location. This eliminates the need for transmitter electronics in a corresponding interrogator, resulting in a large reduction in the power requirements for such data acquisition electronics.

In further accordance with select embodiments of the present invention, yet another advantage corresponds to the fact that the electromagnetic source used to energize the condition-responsive device is in close proximity to such device. Thus, a mere fraction of the energy emitted with the transceiver interrogation method is required to be provided to the condition-responsive device. Alternatively, the same amount of energy as in the transceiver interrogation method could be provided to the condition-responsive device, thus yielding an output signal with a much higher power level, enabling greater read distances for a remote data receiver.

Another advantage of aspects of the present invention is that a condition-responsive device, such as an acoustic wave sensor, can be provided with modulation functionality. By providing a condition-responsive device in selective connection with an RF source via switching and control elements, the condition-responsive device effectively transmits a pulsed data signal, wherein portions of the data signal also preferably include resonant frequency information for the condition-responsive device. This provides the ability for a condition-responsive device to operate not only as a sensor device that transmits information corresponding to certain physical parameters of a tire such as temperature and pressure, but also as a device that can transmit data modulated onto the carrier signal provided by the RF source by selective control of a switching element. Additional advantages may be achieved in accordance with specific communication protocols, such as Direct-Sequence Spread Spectrum (DSSS), which may be employed in such data modulation and RF signaling techniques.

Yet anther advantage of embodiments of the present subject matter is to provide an anti-collision solution for multiple condition-responsive devices operating in the same energizing field. By providing a controllable switching element in parallel with a condition-responsive device, the switching element can selectively short out the condition-responsive device, cloaking the device from the interrogating electromagnetic field, preventing it from being remotely energized. Thus, after a condition-responsive device transmits information to a remote receiver, it can be cloaked for some predetermined amount of time to reduce the chance of data collision from multiple transmitting condition-responsive devices. By implementing handshaking signals to respective controllers of the cloaking switch elements in multiple electronics assemblies in accordance with the present technology, additional cloaking and/or anti-collision arbitration can be accomplished.

A still further advantage of embodiments of the presently disclosed technology is that the subject electronics assemblies can be employed in a variety of potential applications, more particularly in any application in which it is desired to remotely sense physical parameters such as temperature or pressure. Examples of such application environments include, without limitation, tire or wheel assemblies or other locations associated with a vehicle, oil wells, refineries, water plants, etc.

In one exemplary embodiment of the present invention, an electronics assembly includes a condition-responsive device, an antenna, an RF source, and at least one switching element. The condition-responsive device is preferably configured to sense information about at least one physical parameter associated with its surrounding environment. The RF source is preferably connected to the condition-responsive device for exciting the device at selected resonant frequency levels. The antenna is also preferably connected to the condition-responsive device for transmitting radio frequency (RF) output signals generated upon excitation of the condition-responsive device, thus relaying the sensed physical parameter information. In some embodiments, the at least one switching element is provided in series with the condition-responsive device and the RF source and is configured to selectively control the effective transmission of the RF output signals. In other embodiments, the at least one switching element is provided in parallel with the condition-responsive device and is configured to selectively control the effective operation of the condition-responsive device, thus corresponding to selectively cloaking the device.

In accordance with yet another embodiment of the present invention, an electronics assembly includes a condition-responsive device, an RF source, a first switching element, and a second switching element. The condition-responsive device is preferably capable of sensing various changes in its surrounding environment and may be characterized by first and second connection points thereto. The RP source is preferably configured for respective connection to the first and second connection points of the condition-responsive device for exciting the condition-responsive device in a given frequency band. The first switching element may be coupled between the condition-responsive device and the RF source to selectively control the physical series connection between such components. Such first switching element offers modulation functionality for the electronics assembly. The second switching element is electrically coupled to the condition-responsive device for selectively controlling the effective operation of such condition-responsive device, thus providing a controllable cloaking ability.

In more particular exemplary embodiments of the aforementioned electronic assemblies, each switching element may be controlled by a control element such as a microcontroller. In some embodiments, the control element and/or selected switching elements are embodied by an RFID transponder, which may function at a similar operating frequency to the excitation frequency of the condition-responsive device. The condition-responsive device may be a single-port or two-port resonator-based acoustic sensor or may correspond to a delay line sensor. In some embodiments, the condition-responsive device is configured to sense such information as temperature and/or pressure. In other more particular electronics assembly embodiments, a dedicated power source may also be provided for supplying power to selected elements thereof.

A still further embodiment of the present technology corresponds to a tire assembly with integrated sensing features designed to measure and transmit information relating to preselected tire conditions, and may include a pneumatic tire structure, an acoustic wave device, an antenna, an RF source and a controllable switching element. The condition-responsive device is configured to sense information about at least one physical parameter associated with the pneumatic tire structure, such as temperature and/or pressure, while the antenna is preferably connected to the condition-responsive device for facilitating the transmission of RF output signals indicating the at least one sensed physical parameter. The RF source may also be selectively connected to the condition-responsive device via the controllable switching element. The frequency of the RF source is preferably inclusive of potential resonant frequencies associated with the condition-responsive device.

In accordance with yet another embodiment of the present invention, a tire assembly with integrated electronic components includes a tire structure, a condition-responsive device, an antenna, a switching element, and a control element. The condition-responsive device is preferably configured to sense information about at least one physical parameter associated with the tire structure, and may transmit RF output signals therefrom indicating such sensed parameters. The condition-responsive device may be energized via a remote interrogator signal, or via the control element when the control element and switching element are embodied by a radio frequency identification (RFID) transponder. In the case of an RFID transponder, the rectified field emitted from the interrogator can power the RFID control electronics which modulate the antenna and may power the RF transmission section. The switching element and control element determine when the condition-responsive device will be enabled for effective operation in the field, thus providing a means for selectively cloaking the condition-responsive device. In some embodiments, an internal power generation device for supplying power to the control element may also be present.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present invention may include various combinations or configurations of presently disclosed features, steps, or elements, or their equivalents (including combinations of features, parts, or steps or configurations thereof not expressly shown in the figures or stated in the detailed description of such figures). Additional embodiments of the present invention, not necessarily expressed in the summarized section, may include and incorporate various combinations of aspects of features, components, or steps referenced in the summarized objections above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
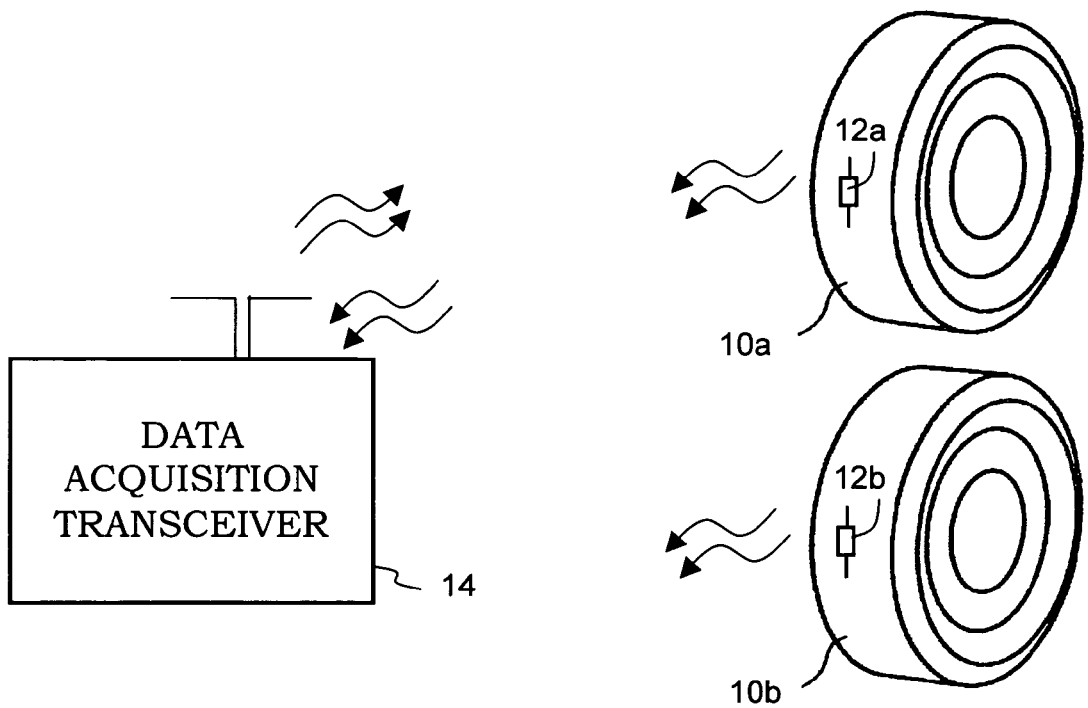
FIG. 1 is a block diagram view of a known exemplary tire monitoring system embodiment with multiple condition-responsive devices in passive communication with a remote data acquisition module.

Repeat use of reference characters throughout the present specification and appended drawings is intended to represent same or analogous features or elements of the invention.

DETAILED DESCRIPTION OF THE PREFERRED EMBODIMENTS

As discussed in the Brief Summary of the Invention section, the present invention is particularly concerned with electronics assemblies that monitor and relay various information related to product identification and/or measurements of selected physical conditions associated with a given environment. Exemplary electronics assembly embodiments of the present invention are respectively illustrated in FIGS. 3, 4 and 5, with aspects of the operation of such assemblies illustrated with respect to FIGS. 6 and 7.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject tire electronics assemblies. Referring now to the drawings, FIG. 1 illustrates aspects of a known tire monitoring system with passively operating electronics assemblies, each including a condition-responsive device, such as an acoustic wave sensor. Tire structures 10a and 10b may respectively incorporate condition-responsive devices 12a and 12b to monitor various physical parameters such as temperature or pressure within the tire or associated wheel assembly. Such a condition-responsive device may include at least one resonator-type sensor, such as a surface acoustic wave (SAW) resonator or a bulk acoustic wave (BAW) resonator. It should be appreciated in accordance with the present technology that a condition-responsive device can correspond to either of these specific types of sensors or to any other commercially available acoustic wave sensor or other type of sensor. The passively operating assemblies with respective condition-responsive devices 12a and 12b of FIG. 1 are energized by a remote source. Thus, a data acquisition transceiver 14 is typically provided with both transmitter and receiver electronics to communicate with the condition-responsive devices 12a and 12b. RF pulses transmitted from the transceiver 14 to the electronics assemblies in tires 10a and 10b excite the SAW devices, which may then store some of this energy and transmit a signal back to the transceiver at the end of each energizing RF pulse.

Referring still to FIG. 1, transceiver 14 transmits an interrogation signal that is intended to energize a given passive condition-responsive device 12a at its frequency of natural oscillation (resonant frequency) such that after an excitation is pulse, each resonator element in condition-responsive device 12a radiates energy stored during excitation. Peak levels of this radiated energy occur at the respective resonant frequencies of the resonator elements in the condition-responsive device 12a. Such signals are then received at the transceiver 14. By monitoring changes in the frequency of the signal transmitted back from condition-responsive device 12a, information corresponding to preselected condition(s) within tire structure 10a can be determined. As discussed in the Background of the Invention section and as partially illustrated with respect to FIG. 1, a problem may arise when multiple condition-responsive devices 12a and 12b (as included in multiple nearby tire structures 10a and 10b) can cause problems with determination of the information received at the transceiver 14. For instance, even though it may be desired to receive sensed information about tire structure 10a only, an interrogator signal can energize both condition-responsive devices 12a and 12b. It may then be difficult to distinguish among signaled information received by transceiver 14, since both condition-responsive devices 12a and 12b can transmit certain resonant frequency information that may overlap and prevent measurement of the properties associated with each distinct tire. Additional concerns may be associated with the passive condition-responsive devices of FIG. 1. Not only does transceiver 14 require complex circuitry including both transmitter and receiver electronics, but if the communication channel exhibits strong levels of signal attenuation the electromagnetic emission levels output by transceiver 14 must be relatively high to sufficiently energize a condition-responsive device. In such exemplary case, the energizing signal will have to propagate through the tire structure itself if the condition-responsive device 12a or 12b is embedded within the tire or wheel assembly.

Figure 2:
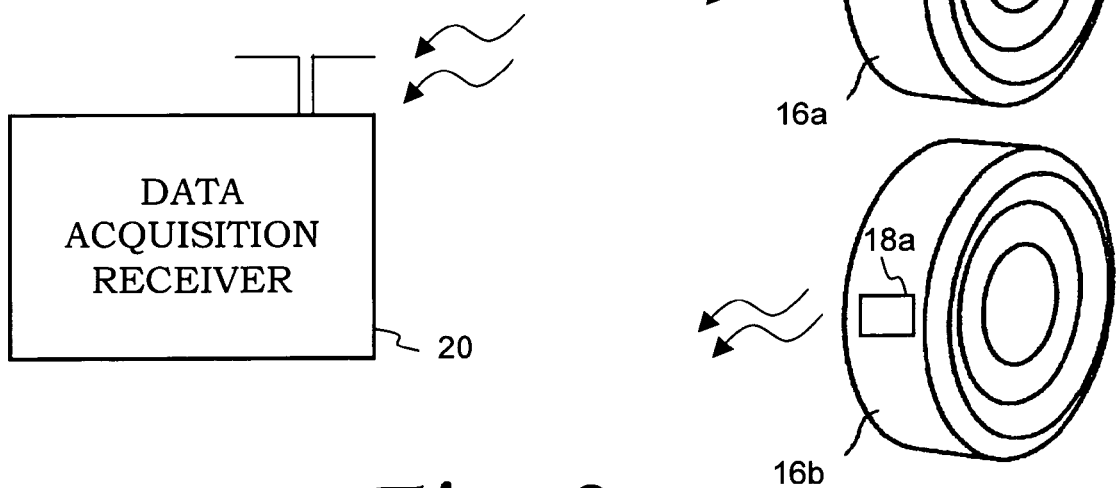
FIG. 2 is a block diagram view of an exemplary tire monitoring system embodiment with multiple condition-responsive devices in active communication with a remote data acquisition module in accordance with the present invention.

Aspects of the present invention provide for certain exemplary electronics assembly embodiments, whereby internal power generation features are provided in conjunction with a condition-responsive device. Referring now to FIG. 2, tire structures 16a and 16b may be outfitted with respective electronics assemblies 18a and 18b, which utilize internal power generation features to yield an actively transmitting electronics assembly. By enabling the condition-responsive devices in electronics assemblies 18a and 18b to actively transmit sensed information from respective tire structures 16a and 16b to a data acquisition receiver 20, the need for transmitter electronics at the data acquisition device may be eliminated. Furthermore, the need to transmit a high-powered energizing signal from an interrogator (as illustrated in FIG. 1) is obviated. By selectively controlling when each respective condition-responsive device transmits information to data acquisition receiver 20, the probability of colliding data transmissions from multiple devices operating in the same energizing field is greatly reduced. Selective data transmission is implemented in part by controllable switching elements also provided in combination with the condition-responsive devices of the respective electronics assemblies 18a and 18b. Other embodiments of the present invention may not necessarily generate power internally for active operation as depicted in FIG. 2, but still employ data modulation functionality effected by the selective control of switching elements in combination with a condition-responsive device, such as in accordance with utilization of an RFID transponder.

Figure 3:
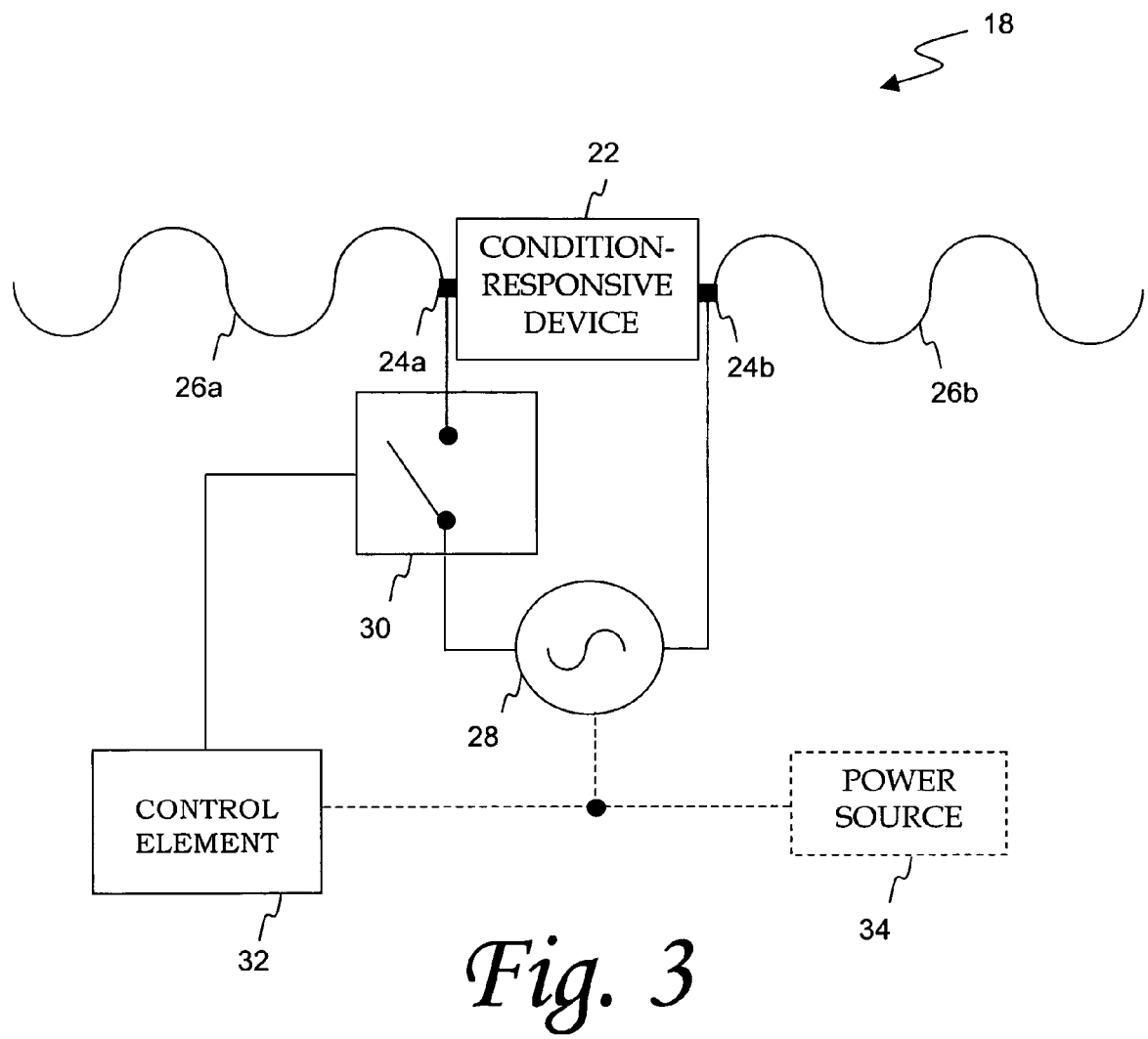
FIGS. 3, 4 and 5 are respective schematic representations of various exemplary electronics assembly embodiments with condition-responsive devices and controllable switching elements in accordance with the present invention.

Referring now to FIG. 3, a first electronics assembly embodiment 18 for monitoring predetermined conditions within a tire structure or corresponding wheel assembly is illustrated. Electronics assembly 18 may be provided in conjunction with a tire structure in a variety of fashions. For instance, electronics assembly 18 may be attached to the interior of a tire structure or some other location relative to a wheel assembly. Alternatively, electronics assembly 18 may be embedded within a tire structure itself. Still further, electronics assembly 18 may be encased in an elastomer material with appropriate dielectric properties that may then be adhered to or embedded within a tire structure. The electronics assembly may also be packaged in any number of ways and may be attached to the wheel assembly, the valve stem or any other place that allows for accurate temperature and pressure measurement of the tire. In accordance with the variety of possible locations for electronics assembly 30, it will be appreciated in accordance with the present subject matter that an electronics assembly "integrated" with a tire structure or wheel assembly is intended to encompass all such possible locations and others as within the purview of one of ordinary skill in the art.

Electronics assembly 18 preferably includes a condition-responsive device 22, such as a sensor based on acoustic wave technology, which is capable of sensing various information about given tire conditions, such as temperature and pressure. A specific example of a condition-responsive device for use in accordance with embodiments of the present invention is a SAW device as developed by TRANSENSE TECHNOLOGIES, PLC. Specific aspects of such a SAW device are disclosed in published U.S. patent application Ser. No. 10/057,460, which is incorporated herein by reference for all purposes. Such a SAW device includes at least three resonator elements, each operating at a different resonant frequency, for example 433.28 MHz, 433.83 MHz and 434.26 MHz. Three resonator elements in combination yield a condition-responsive device that provides sufficient information to determine both the temperature and pressure levels in a tire. The resonant frequencies for such multiple resonator elements are preferably designed such that the distance between adjacent resonant frequencies is always greater than the resonator bandwidths at any pressure or temperature condition within a tire. Condition-responsive device 22 may be configured as a single port device with two or more physical connection points 24a and 24b to the single port. Condition responsive device 22 may also be a two-port device, or may consist of a one-port delay line configuration. An antenna may be connected to the condition-responsive device's input port to facilitate the transmission of output signals therefrom. For instance, two antenna wires 26a and 26b may be provided in combination to serve as a dipole antenna for the condition-responsive device 22. Antenna wires 26a and 26b may have respective straight or curved configurations and lengths that are optimized for desired radiation performance. It should be appreciated in accordance with the present subject matter that utilization of other antenna configurations, such as monopole antennas, loop antennas, helical antennas, or others as within the purview of one of ordinary skill in the art, is within the spirit and scope of the present invention. Electrical connections 24a and 24b correspond to actual physical connections between respective antenna wires 26a and 26b to condition-responsive device 22, and such connections may be made by a variety of methods. For instance, antenna wires 26a and 26b may be soldered to respective pads on condition-responsive device 22, or they may be pinned into or onto the attachment points at the device, or attached using clamps, screws, conductive adhesive, or other means as within the purview of one of skill in the art.

Referring still to FIG. 3, electronics assembly 18 also preferably includes an RF source 28. RF source 28 may be characterized by a variety of different operating frequencies and corresponding bandwidths. In preferred embodiments of the disclosed technology, the operating frequency of RF source 28 corresponds to one that matches the resonant frequency of the condition-responsive device 22. When condition-responsive device 22 includes multiple resonator elements, the RF carrier 28 preferably has a bandwidth that encompasses the respective resonant frequency ranges of each resonator element in the condition-responsive device 22. A minimum bandwidth for some exemplary embodiments of the technology could be 500 kHz and may be as high as 1–2 MHz in some particular exemplary embodiments. However, a relatively broadband signal that is still inclusive of the relatively narrow band of resonant frequencies for the condition-responsive device may be utilized in accordance with certain digital modulation and RF signaling techniques, such as with direct-sequence spread spectrum (DSSS) or frequency hopping spread spectrum technology. When the RF source is a broadband signal whose bandwidth is much greater than the minimum required bandwidth, a spread spectrum signal may effectively be transmitted by electronics assembly 18. Since DSSS technology includes multiple access features that allow multiple signals to occupy the same bandwidth, many condition-responsive devices would be enabled to simultaneously read respective signals transmitted thereto.

The RF source 28 is preferably connected to condition-responsive device 22 through a switching element 30 that selectively controls the effective connection between RF source 28 and condition-responsive device 22. Switching element 30 could correspond to a variety of different devices. One example of a switching element is a mechanical switch or an electrical switch, such as implemented by a transistor (such as a Field Effect Transistor (FET)). The "on" or "off" state of switching element 30 may be controlled by a control element 32. Control element 32 may be a microcontroller with optionally varied degrees of functionality. In other embodiments of the present invention, switching element 30 and control element 32 may correspond to a radio frequency identification (RFID) chip. RFID chips often include their own microcontroller that can be employed to selectively control the connection between condition-responsive device 22 and RF source 28. The RFID chip may also provide connection to RF source 28 when RF source 28 is not connected locally but is remotely located in an interrogator. An RFID microcontroller may be characterized by limited functionality and thus provision of an additional control element in such instances is within the spirit and scope of embodiments of the present invention. Switching element 30 may also contain a variety of active and passive components such as but not limited to resistors, inductors, diodes, transistors, and others to further define application-specific switching requirements such as related to impedance matching, circuit switching, pulse shaping, etc.

By selectively controlling when the switching element 30 is open or closed, data is effectively modulated at the condition-responsive device 22. For instance, referring to FIG. 6, the presence of a physical connection (closed switch) may correspond to the transmission of a binary "1" while absence of a physical connection (open switch) may correspond to the transmission of a binary "0," representative of simple Amplitude Shift Keying (ASK) modulation of data transmitted by the condition-responsive device 22 via antenna wires 26a and 26b. This modulated data signal 38 could correspond to a variety of information, such as that representative of such parameters associated with a tire or wheel environment as the tread wear, revolution count, identification number, vehicle speed, sidewall deflection levels, etc. If the switching element 30 and control element 32 is an RFID transponder, then the data modulation could be controlled to transmit a unique identification variable corresponding to the associated tire assembly or other product with which it is integrated or to other information stored in the RFID memory. RFID tags prove helpful in asset tracking and other monitoring applications. Whenever the RF source 28 is indeed connected to the condition-responsive device 22 and the RF source is configured with an operating frequency range inclusive of the resonant frequency of the condition-responsive device 22, not only can the electronics assembly 18 relay information via its modulated data signal, but it can also relay sensed tire condition information determined via the condition-responsive device 28.

Each time the RF source 28 is connected to the condition-responsive device 22, it preferably energizes each resonator element of device 22 at its respective resonant frequency. Once switching element 30 is effectively opened, the antenna embodied by leads 26a and 26b transmits a signal based on energy stored in each resonator element of condition-responsive device 22. This signal is indicative of sensed temperature and/or pressure information. Aspects of such a phenomenon can be understood with respect to FIG. 7. Signal 40 is representative of a portion of the modulated data signal 38 of FIG. 6, which is output by the antenna of electronics assembly 18. The pulse portion 42 of signal 40 corresponds to the transmitted signal when controllable switching element 30 yields a closed connection. As soon as this physical connection is removed (open switch), the transmitted signal 40 includes a tail portion 44 that includes information related to the sensed tire parameters. An appropriately configured receiver can detect from such tail portion 44 the resonant frequencies of each acoustic resonator element in the condition-responsive device 22, thus yielding temperature and/or pressure data. Thus, referring to FIG. 6, the data signal 38 transmitted by exemplary electronics assembly 18 includes such a tail portion 44 at the end of each data pulse represented by one or more binary "1." A receiver can monitor and compare a plurality of such tail portions 44 as a way of ensuring that a correct data reading is obtained from the condition-responsive device 22.

Referring again to FIG. 3, in order for electronics assembly 22 to truly operate as an active assembly, some sort of power source 34 may also be provided to power the RF source 28. In some instances, power source 34 may also be used to power other elements of electronics assembly 18 such as the control element 32 and the switching element 30 (not shown). In some embodiments, power source 34 may be a battery, such as but not limited to a rechargeable battery. In other embodiments, power source 34 may be an internal power generation device such as one that includes piezoelectric elements configured to convert mechanical energy from tire rotation to electrical energy that may then be stored therein. An example of a power generation device for utilization with the present subject matter is disclosed in currently pending U.S. patent application Ser. No. 10/143,535, entitled "System and Method for Generating Electric Power from a Rotating Tire's Mechanical Energy Using Piezoelectric Fiber Composites," which is incorporated by reference herein for all purposes. In other applications, power may be inductively coupled from a wheel well to the electronics assembly in a tire. It should be appreciated that any type of specific power source may be employed, while still remaining within the spirit and scope of the present subject matter. In some cases, such as those exemplified by RFID, the power source can be an external RF source such as that provided by a remote interrogator.

Figure 4:
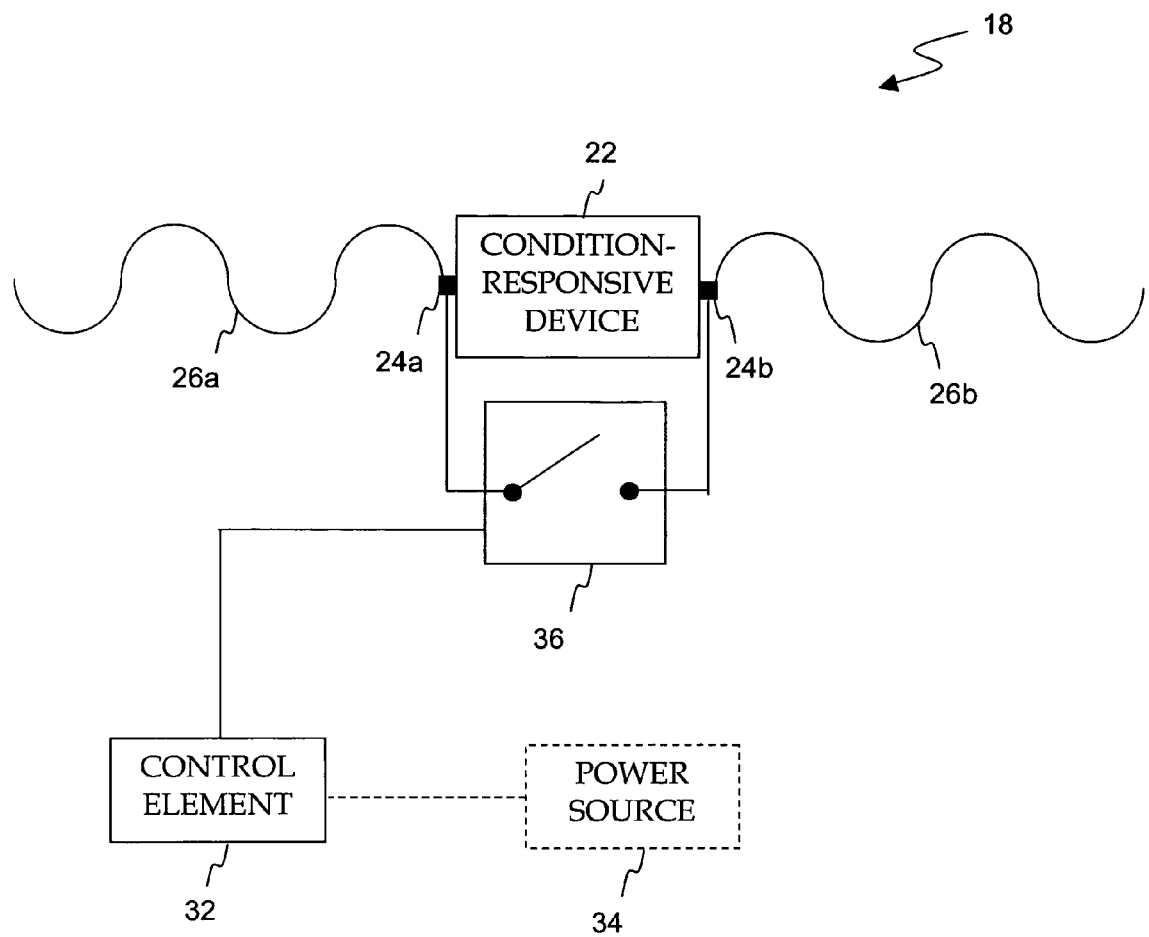

Referring now to FIG. 4, another exemplary electronics assembly embodiment 18 is illustrated. Elements of the embodiment of FIG. 4 are similar to those of FIG. 3 and thus like reference numerals are utilized to indicate such instances. Electronics assembly embodiment 18 of FIG. 4 includes a switching element 36, similar to switching element 30 of FIG. 3, which may also correspond to a variety of different devices, such as a mechanical switch or an electrical switch, such as implemented by a transistor (such as a Field Effect Transistor (FET)). Switching element 36 may be opened or closed via control element 32, which may be a microcontroller. In other embodiments of the present invention, switching element 36 and control element 32 may correspond to a radio frequency identification (RFID) chip. RFID chips often include their own microcontroller that can be employed to selectively control the connection between condition-responsive device 22 and RF source 28. An RFID microcontroller may be characterized by limited functionality and thus provision of an additional control element in such instances is within the spirit and scope of embodiments of the present invention. Switching element 30 may also contain a variety of active and passive components such as but not limited to resistors, inductors, diodes, transistors, and others to further define application-specific switching requirements such as related to impedance matching, circuit switching, pulse shaping, etc.

Switching element 36 is preferably in parallel with condition-responsive device 22, and may also be connected to the electrical connection points 24a and 24b. In embodiments where controllable switching element 36 is an RFID transponder, the antenna wires 26a and 26b may also serve to facilitate transmission of signals from such RFID component as well as from the condition-responsive device 22. Alternatively, antenna wires 26a and 26b could be configured to operate as a dual-frequency antenna. In other embodiments, separate antennas may be provided for the condition-responsive device and for the RFID component. Switching element 36 may be selectively opened or closed to effect cloaking of the condition-responsive device 22. When a physical connection (closed switch) is provided via switching element 36, then the condition-responsive device 22 is effectively shorted out and hidden from the surrounding field of operation.

When switching element 36 and control element 32 are embodied by an RFID transponder, it should be appreciated that ID signals may still be transmitted by electronics assembly 18 even when the condition-responsive device is cloaked. With the provision of an RFID transponder, embodiment 18 of FIG. 4 is still provided with modulation functionality in accordance with the present invention due to internal modulation of an RFID transponder in transmitting its unique identification code. An internal power source 34 may also be provided with the embodiment of FIG. 4, but it should be appreciated that when control element 32 and switching element 36 are embodied by an RFID transponder, a remote energizing signal to the RFID transponder may simultaneously excite the condition-responsive device.

By providing a mechanism for cloaking condition-responsive device 22, such device can be turned off for a predetermined amount of time after it transmits information to a remote receiver location. Control element 32 can instruct the electronics assembly 18 to turn off for a prescribed amount of time after it has been read or after it transmits a data packet or stream of data. If such time duration is a randomly generated variable, then the probability of data collision from two condition-responsive devices in the same energizing field transmitting simultaneously is equal to the duration of time for a given transmission divided by the mean time duration between successive data transmissions. Thus, selective control of switching element 36 can serve to mitigate the potential effects of interference when multiple condition-responsive devices operate in proximity to one another.

The control element 32 provided to switching element 36 may employ handshaking technology to further reduce the probability of data collision at a given data acquisition receiver. The implementation of handshaking techniques, such as common to RFID technology, should be within the purview of one of ordinary skill in the art and thus specific details regarding such operation are not presented herein, especially since specific handshaking protocols arbitrarily depend on the number of coincident condition-responsive devices and the desired frequency of data acquisition. When control element 32 and switching element 36 correspond to an RFID component, handshaking within electronics assembly 18 of FIG. 4 may be quite easily implemented as known RFID transponders are equipped with an established handshaking protocol. Handshaking protocols may, however, require transmitter electronics in a remote interrogator.

Figure 5:
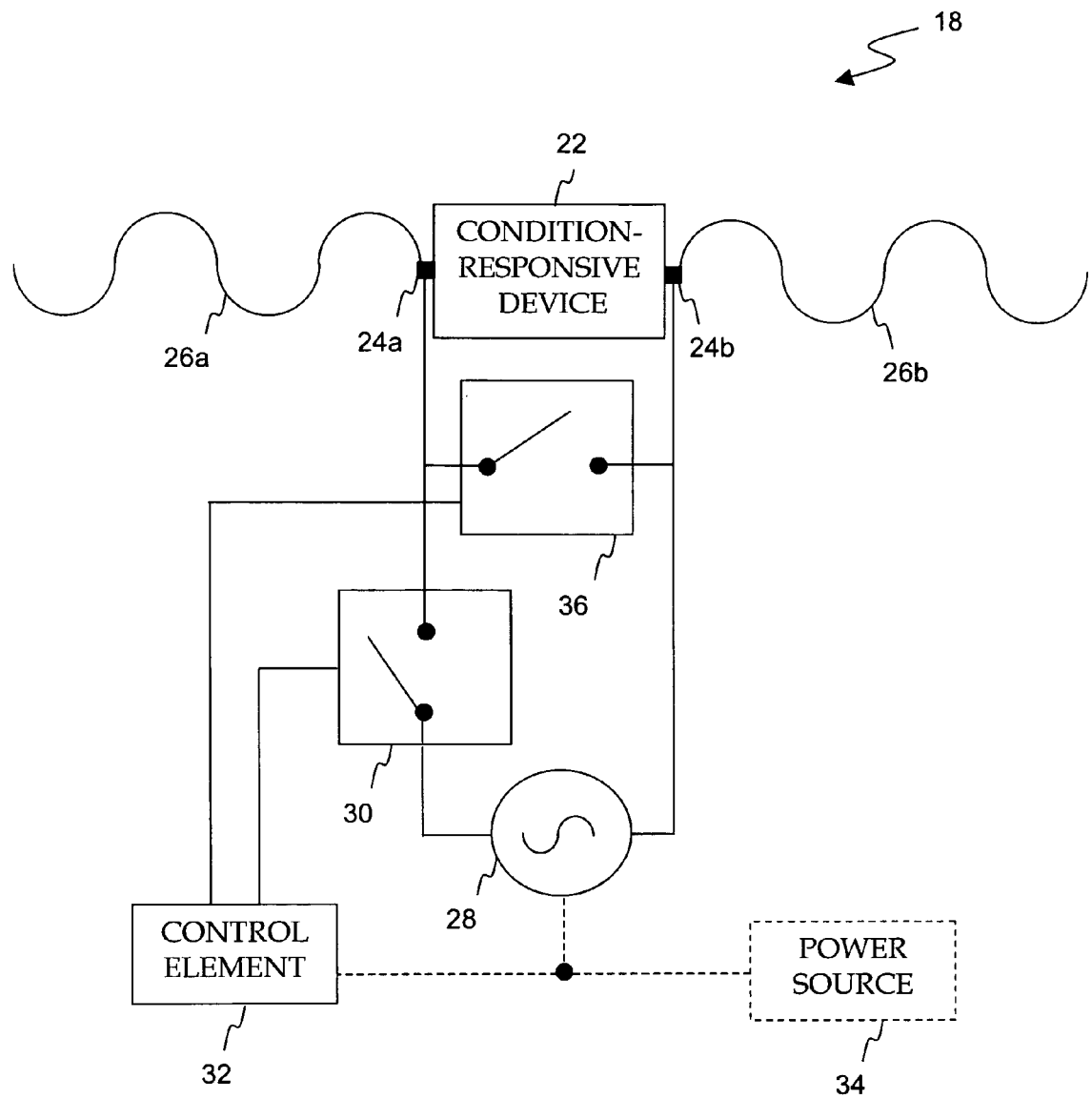
Figures 6, 7:
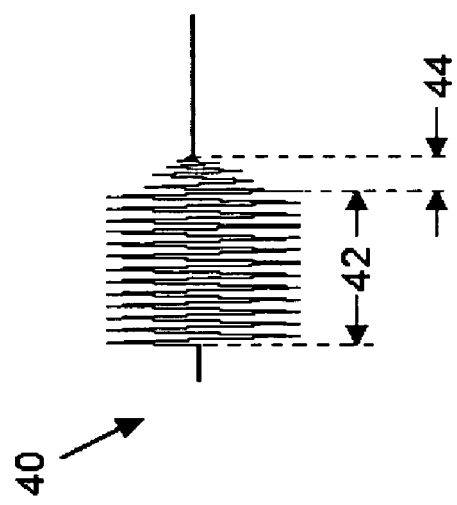
FIG. 6 provides a graphical representation of an exemplary modulated data signal that may be transmitted from a condition-responsive device in accordance with embodiments of the present invention.
FIG. 7 provides a graphical representation of an exemplary data pulse transmitted from a condition-responsive device in accordance with embodiments of the present invention.

Referring now to FIG. 5, yet another embodiment of the present subject matter combines selected components from the exemplary embodiments of FIGS. 3 and 4. Like reference numerals are utilized to indicate when elements of the embodiment of FIG. 5 are similar to those of FIGS. 3 and 4, and selected previous descriptions are also intended to apply. Exemplary electronics assembly embodiment 18 of FIG. 5 is provided with more combined functionality than the other previously discussed embodiments, as such assembly is afforded both data modulation and cloaking abilities in the same assembly.

With particular reference to FIG. 5, when switching element 36 is closed and switching element 30 is open, condition-responsive device 22 is cloaked, or hidden from the energizing field. When switching element 36 is an RFID transponder, it should be appreciated that ID signals may still be transmitted by electronics assembly 18 even when the condition-responsive device is cloaked. When switch 36 is held open and while switch 30 is selectively opened and closed, then electronics assembly 18 operates as a data transmitter. When both switches 30 and 36 are open, the electronics assembly 18 operates as a conventional acoustic wave sensor. A control element 32 is preferably provided to control the states of switching elements 30 and 36. It should be appreciated that a respective control element 32 may be provided for each switching element 36, and also that selected switching elements may be embodied by an RFID component. The optional power source 34 of FIG. 4 may be a battery, a piezoelectric generator, an inductively coupled source, or other appropriate source.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An electronics assembly, comprising:
   a condition-responsive device configured to sense information about at least one physical parameter associated with its surrounding environment;
   an RF source connected to said condition-responsive device for exciting said condition-responsive device at selected resonant frequency levels such that said condition-responsive device generates an output signal in response thereto;
   an antenna for receiving said output signal from said condition-responsive device and for transmitting a radio frequency (RF) signal indicating said at least one physical parameter; and
   at least one switching element configured to selectively control the effective transmission of said RE signal,
   wherein said at least one switching element is provided in parallel with said condition-responsive device and is configured to selectively control the effective operation of said condition-responsive device, thus corresponding to selectively cloaking said condition-responsive device,
   whereby one or more data types may be selectively transmitted from the electronic assembly.

2. An electronics assembly as in claim 1, wherein said condition-responsive device comprises an acoustic wave device including a plurality of acoustic wave resonators.

3. An electronics assembly as in claim 2, wherein said acoustic wave resonators are surface acoustic wave (SAW) resonators.

4. An electronics assembly as in claim 2, wherein said acoustic wave device comprises a one-port or a two-port resonator-based sensor.

5. An electronics assembly as in claim 1, wherein said condition-responsive device comprises a delay line sensor.

6. An electronics assembly as in claim 2, wherein said plurality of acoustic wave resonators function to sense information corresponding to the temperature and pressure within its surrounding environment.

7. An electronics assembly as in claim 1, further comprising a power source connected to said RF source.

8. An electronics assembly as in claim 1, further comprising a microcontroller connected to and configured for controlling said at least one switching element.

9. An electronics assembly as in claim 1, wherein said at least one switching element comprises a field-effect transistor (FET).

10. An electronics assembly as in claim 1, wherein said at least one switching element comprises a radio frequency identification (RFID) transponder.

11. An electronics assembly as in claim 1, wherein said electronics assembly is integrated with and configured for operation in a pneumatic tire structure or wheel assembly.

12. An electronics assembly, comprising:
    a condition-responsive device capable of sensing various changes in its surrounding environment, said condition-responsive device characterized by first and second electrical connection points thereto;
    an RF source configured for respective connection to said first and second connection points of said condition-responsive device for exciting said condition-responsive device in a given frequency band;
    a first switching element coupled between said condition-responsive device and said RF source for selectively controlling the connection between said RF source and a selected connection point of said condition-responsive device;
    a second switching element coupled with said condition-responsive device for selectively controlling the effective operation of said condition-responsive device; and
    first and second antenna wires respectively connected to said first and second electrical connection points of said condition-responsive device, wherein said first and second antenna wires function together as a dipole antenna for said electronics assembly.

13. An electronics assembly as in claim 12, wherein said condition-responsive device comprises an acoustic wave device including a plurality of acoustic wave resonators.

14. An electronics assembly as in claim 13, wherein said acoustic wave resonators are surface acoustic wave (SAW) resonators.

15. An electronics assembly as in claim 12, wherein said condition-responsive device comprises a delay-line sensor.

16. An electronics assembly as in claim 12, wherein said plurality of acoustic wave resonators function to sense information corresponding to the temperature and pressure within its surrounding environment.

17. An electronics assembly as in claim 12, further comprising a power source connected to said RF source.

18. An electronics assembly as in claim 12, further comprising a microcontroller connected to and configured for controlling said first and second switching elements.

19. An electronics assembly as in claim 12, wherein the RF output signals transmitted by said antenna include modulated data effected by selective actuation of said first switching element.

20. An electronics assembly as in claim 19, wherein said modulated data includes information corresponding to at least one parameter selected from the group consisting of tread wear, revolution count, vehicle speed, sidewall deflection level, forces in the tire, and tire identification information.

21. An electronics assembly as in claim 12, wherein selected of said switching elements are field-effect transistors (FETs).

22. An electronics assembly as in claim 12, wherein selected of said switching elements comprise a radio frequency identification (RFID) transponder.

23. An electronics assembly as in claim 22, wherein the operating frequency of said REID transponder is within said given frequency band for exciting said condition-responsive device.

24. An electronics assembly as in claim 12, wherein said electronics assembly is integrated with and configured for operation in a pneumatic tire structure or vehicle wheel.

* * * * *